United States Patent [19]

Broering et al.

[11] 4,104,453

[45] Aug. 1, 1978

[54] MELT DISPERSION SAPONIFICATION OF ETHYLENE-VINYL ACETATE POLYMER

[75] Inventors: Leo H. Broering, Fort Wright, Ky.; Gary W. Duncan, Cincinnati, Ohio

[73] Assignee: National Distillers and Chemical Corporation, New York, N.Y.

[21] Appl. No.: 813,134

[22] Filed: Jul. 5, 1977

[51] Int. Cl.$^2$ .............................................. C08F 8/12
[52] U.S. Cl. .................................................... 526/10
[58] Field of Search ......................................... 526/10

[56] References Cited

U.S. PATENT DOCUMENTS

| | | | |
|---|---|---|---|
| 2,467,774 | 4/1949 | Plambeck | 260/86 |
| 3,418,265 | 12/1968 | McClain | 260/29.6 |
| 3,422,049 | 1/1969 | McClain | 260/29.6 |
| 3,432,339 | 3/1969 | Howell et al. | 117/132 |
| 3,432,483 | 3/1969 | Peoples et al. | 260/87.3 |
| 3,449,291 | 6/1969 | Lerman et al. | 260/41 |
| 3,510,463 | 5/1970 | Bristol | 260/87.3 |
| 3,586,654 | 6/1971 | Lerman et al. | 260/41 |
| 3,669,922 | 6/1972 | Bartsch et al. | 260/41 R |
| 3,674,736 | 7/1972 | Lerman et al. | 260/41 R |
| 4,027,079 | 3/1977 | McClain | 526/10 |

FOREIGN PATENT DOCUMENTS 88,404  3/1972  German Democratic Rep.. 526/10 UX

OTHER PUBLICATIONS

C.A. 74, 32375v.
C.A. 74, 54620y.

*Primary Examiner*—Stanford M. Levin
*Attorney, Agent, or Firm*—Kenneth D. Tremain

[57] ABSTRACT

This invention relates to a new and useful process for the production of saponified ethylene-vinyl acetate polymers in the form of finely divided particles by dispersing the saponified polymer in the presence of an ethylene oxide-propylene oxide block copolymer and at least one other anionic dispersant selected from the group consisting of the salt of a polycarboxylic acid and a condensed arylsulfonate salt.

12 Claims, No Drawings

MELT DISPERSION SAPONIFICATION OF ETHYLENE-VINYL ACETATE POLYMER

CROSS-REFERENCE

Commonly assigned, copending U.S. Pat. application Ser. No. 564,200 filed Apr. 1, 1975 in the name of Dorothee M. McClain et al, now U.S. Pat. No. 4,027,079.

BACKGROUND OF THE INVENTION

It is well-known that high molecular weight thermoplastic resins, for example, polyethylene and ethylene copolymers, may be converted to dispersions of spherically shaped particles which are substantially devoid of particles greater than 25 microns in diameter and in which the number average particle diameter is less than about 10 microns. Thus, McClain U.S. Pat. No. 3,422,049 teaches that such dispersions of finely divided particles may readily be prepared by agitating the molten resin in admixture with water at elevated temperatures and at autogenous pressure, in the presence of certain dispersing agents which are particular block copolymers of ethylene oxide and propylene oxide. The non-agglomerated spherical particles can be recovered as powders by cooling the dispersions below the fusion point of the resin and collecting the suspended material by filtration or centrifugation.

U.S. Pat. No. 3,418,265 further teaches that the particle size of such thermoplastic resin dispersions can be reduced still further, to the sub-micron level, while retaining the unique spherical particle shape by including in the dispersion process a volatile, inert, water-insoluble organic liquid that is soluble in the thermoplastic resin in an amount between 0.5 and 20 parts per 100 parts of the resin, whereupon stable, aqueous, film-forming latices of high molecular weight polyethylene can also be formed by including a liquid vinyl monomer such as styrene in the dispersion process.

Although the foregoing dispersion procedures are conveniently operated as batch processes, it is also known to produce such finely divided powders in a sequential, continuous dispersion process. See, e.g., U.S. Pat. No. 3,432,483.

U.S. Pat. No. 3,586,654 teaches that it is further possible to conduct the dispersion process in such a way that the polymer particles may be further transformed into spherical particles of controlled average size and size distributions which are the same, larger or smaller than the starting particles. If desired, the dispersion process can be modified in such a manner as to produce spherical foamed particles (U.S. Pat. No. 3,432,801), or to incorporate within the particles certain colorants (U.S. Pat. No. 3,449,291) and pigments (U.S. Pat. No. 3,674,736).

The fine powders are, by virtue of their small particle size, narrow particle size range, and spherical particle shape, unique states of matter which cannot readily be prepared by other conventional processes known in the art. The advantages and utility of such fine powders have been described in many of the aforesaid patent disclosures. In addition, it has been found that various substrates can be coated by applying the above described dispersions of polyolefin fine powders in an inert carrier, heating to evaporate the carrier, and fusing the polyolefin to the substrate (U.S. Pat. No. 3,432,339). Further, U.S. Pat. No. 3,669,922 teaches a process for preparing colored polymer powders having controlled charge and printing characteristics of value as toners in electrostatic printing.

The hydrolysis of ethylene polymers containing hydrolyzable copolymerized units, for example, vinyl acetate units, is also known in the art. Usually, the hydrolysis of such polymers is accomplished by the process of alcoholysis or transesterification in an alcoholic medium in the presence of an acid or basic catalyst, whereby the acetic ester of the alcohol employed is recovered as a by-product. Solution alcoholysis processes, i.e., in which the reaction is carried out in a mixed solvent of an aromatic hydrocarbon and lower primary alcohol, require the use of large volumes of solvent and alcohol and larger reactors or kettles. The finished product must be recovered from solution and washed with additional alcohol. The time required to dissolve the resin before hydrolysis is long and the recovery procedure is also time consuming. In addition, the solvent-alcohol mixtures must be separated and recycled for re-use. Solvent losses are incurred which are undesirable from the view point of air pollution as well as for economic reasons. The inherent fire hazard in any process involving organic solvents is a further disadvantage of solution alcoholysis and, additionally, solvent shortages can also present problems.

A different process in which the ethylene-vinyl acetate copolymer in the form of pellets is hydrolyzed by alcoholysis in the swollen solid phase, in a substantially similar alcoholysis medium, is described in U.S. Pat. No. 3,510,463. Pressure alcoholysis in the presence of sodium hydroxide in hexane-methanol and methanol alone at temperatures up to 230° C. has also been disclosed. (Japan. 70 33,065, October 4, 1970; Chem, Abstrs. 74, 32375v and Japan. 70 33,066; Chem. Abstrs. 74, 54620y.)

Less commonly, the hydrolysis of ethylenevinyl acetate copolymer is accomplished by the process of saponification, for example, in an aqueous emulsion where at least a stoichiometric amount of a strong base such as sodium or potassium hydroxide is required for the hydrolysis of a given number of moles of combined vinyl acetate units in the copolymer. See, e.g., U.S. Pat. No. 2,467,774. In general, however, saponification of ethylenevinyl acetate copolymers is a slow process at ambient temperatures. Thus, Davies and Reynolds, J. Applied Polymer Sci. 12, No. 1, 47 (1968), have reported that at 25° C., 24 hours is required to effect an 18.1% saponification of an ethylene-vinyl acetate copolymer containing 50.8 weight percent vinyl acetate.

DDR (East German) Patent 88,404, describes a onestep dispersion and saponification of ethylene-vinyl acetate copolymers. This process is carried out in aqueous media at 100°–260° C., under autogenous pressure, in the presence of a one to two-fold stoichiometrically required amount of sodium or potassium hydroxide, optionally in the presence of an inert, water-insoluble softening agent and in the presence of a surface active agent such as an alkyl sulfonate, an alkyl aryl sulfonate, an acyl derivative of N-methyl taurine, or an alkali salt of a higher carboxylic acid, or a non-ionic surfactant based on ethylene oxide (ethoxylated fatty alcohol). The East German patent does not disclose the particle size range of the product when the process was carried out without any added softening agent or surfactant. In fact, the product was actually milled before classification, and even after milling, the particle size range of the milled product was predominantly (97%) in the range of 125–1252 microns. When a surfactant was used, the unmilled classified product was still comparatively coarse. In the most favorable instance disclosed, employing an N-alkyl sulfonate surface active agent, 78.3% of the particles had diameters in the range of 125–1000 microns, whereas only 21.7% of the particles had diameters below 125 microns.

It is evident from the East German patent that the so-called "finely granulated" product produced therein is much coarser than the finely divided powders produced, for example, in the aforesaid McClain U.S. Pat. No. 3,422,049.

As described in the aforesaid copending U.S. appln. Ser. No. 564,200, when the dispersion and saponification process of the East German patent is carried out using the ethylene oxide-propylene oxide block copolymers of the aforesaid McClain patent, finely divided dispersions of the hydrolyzed copolymer are not obtained. Indeed, the particles have dimensions of 100 microns or more, and a portion of the particles are found to be irregular in shape (short fibers, agglomerates). Finely-divided dispersions can only be obtained if the product contains residual salts in amounts no greater than 0.1% calculated as the cation.

The reduction in the amount of residual salts is accomplished by water washing the saponified polymer preferably in the presence of a surfactant until the level of residual salt is not greater than 0.1% calculated as cation. Thereafter, the washed polymer is then dispersed in an aqueous medium comprising the ethylene oxidepropylene oxide block copolymer as dispersant to obtain finely-divided product.

SUMMARY OF THE INVENTION

It has now been found that water-washing steps required in the process of the said copending application can be obviated by the use of anionic polycarboxylic acid salt and/or condensed aryl sulfonate salt dispersing agents along with the aforesaid ethylene oxide-propylene oxide block copolymer dispersants as dual dispersing agents for the saponified polymer. Thus, this invention provides a process for directly producing finely-divided dispersions of saponified ethylene-vinyl acetate polymers in a single reaction step by using as dispersing agent an ethylene oxide-propylene oxide block copolymer and an anionic polycarboxylic acid salt and/or condensed aryl sulfonate salt dispersant to disperse the saponified polymer in the saponification reaction mixture from which it is recovered and dried to a finely-divided powder. As a consequence, the multi-step washings required by the process of the said copending application are unnecessary and considerable cost-saving and greater production efficiency are realized thereby.

The results obtained with the dual dispersing agents of the present invention are indeed surprising in view of the fact that when used as sole dispersing agent, the anionic polycarboxylic acid salts, the anionic condensed aryl sulfonate salts and the oxyethylene-oxypropylene block copolymers are ineffective in dispersing the saponified product to finely divided form. The condensed aryl sulfonate salt dispersants are not effective in dispersing saponified ethylene-vinyl acetate polymers from saponification reaction mixtures, as shown in the accompanying examples. Experience to the present time with these dispersing agents has shown little, if any, tendency to produce a dispersion of the saponified product, the product obtained being a continuous mass which adhered to the walls of the reactor and the agitator. Similarly, the ethylene oxide-propylene oxide block copolymers are shown to be ineffective in producing fine dispersions of saponified ethylene-vinyl acetate copolymers except where the residual salt content of the saponified product is reduced to not more than 0.1% calculated as cation.

Further, when ethylene oxide-propylene oxide block copolymer dispersants combined with other dispersants such as sulfate ester, e.g., lauryl sulfate, non-ionic dispersants, e.g., silicone glycol copolymers, polyoxyalkylated amines and alkyl aryl polyether alcohols, and amphoteric surfactants were employed in attempted dispersions of saponified ethylene-vinyl acetate polymers from the saponification reaction medium, only coarse dispersions of the product were obtained and the degree of saponification obtained was substantially less than that obtained by the present inventive process, as illustrated in the accompanying examples.

The exact mechanism by which this invention operates is not clearly understood and no attempt at explaining these surprising results will be made. Nevertheless, the use of ethylene oxide-propylene oxide block copolymer dispersants with anionic polycarboxylic acid salt and/or condensed aryl sulfonate salt dispersants in the described process does provide new and unobvious results resulting in a more economical and more efficient process for producing saponified ethylene-vinyl acetate in finely-divided form.

DESCRIPTION OF THE PREFERRED EMBODIMENTS

In accordance with a preferred mode of the invention, the ethylene-vinyl acetate interpolymer in any convenient form, e.g., in the form of pellets, is first placed in a stirred pressure-resistant autoclave with water, which forms the continuous phase of the dispersion, and usually containing the combined dispersing agents dissolved therein. Thereafter, the agent or agents required for saponification are added. The saponification can be effected by art-recognized procedures wherein, in general, the saponifying agent is a strong inorganic base in an amount at least stoichiometrically equal to the amount of copolymerized vinyl acetate groups to be saponified.

The ethylene-vinyl acetate polymers which are saponified and dispersed by the process of this invention are well-known in the art. The polymers generally contain from about 1–70 weight percent vinyl acetate and range in number average molecular weight from about 1000 to 200,000. The ethylene-vinyl acetate polymer can optionally contain up to about 20 weight percent of a third comonomer polymerizable with the ethylene and vinyl acetate. Illustrative termonomers are methyl acrylate, methyl methacrylate, ethyl acrylate, ethyl methacrylate, propyl acrylate, propyl methacrylate, butyl acrylate, butyl methacrylate, dimethyl itaconate, diethyl itaconate, dimethyl-2-methylene glutarate, diethyl-2-methylene glutarate, dimethyl maleate, diethyl fumarate, dibutyl fumarate, and the like.

The preferred ethylene-vinyl acetate copolymers herein have a melt index less than about 40. More preferred are the ethylene-vinyl acetate copolymers which have a melt index of less than about 25 and the most preferred resins have a melt index of less than about 10.

The non-ionic dispersing agents of the present process are water-soluble block copolymers of ethylene oxide and propylene oxide preferably having a molecular weight above about 3500 and an ethylene-oxide content of at least about 50% by weight. Representative of such compounds are several of the non-ionic surface active agents marketed by Wyandotte Chemicals Co. prepared (see the Pluronic Grid Approach, Volume II, Wyandotte Chemicals Co., 1957) by polymerizing ethylene oxide on the ends of preformed polymeric base of polyoxypropylene. Both the length and molecular weight of the polyoxypropylene base and the polyoxyethylene end segments can be varied to yield a wide variety of products. For example, one of the compounds found to be suitable for the practice of this invention is Pluronic F-98, wherein a polyoxypropylene of average molecular weight of 2700 is polymerized with ethylene oxide to give a product of molecular weight of about 13,500. This product may be described as containing 20 weight percent of propylene oxide and 80 weight percent of ethylene oxide. Further examples of suitable dispersing agents are Pluronic P-105 (MW 6500, 50% propylene oxide, 50% ethylene oxide), F-88 (MW 11,250, 20% propylene oxide, 80% ethylene oxide), F-108 (MW 16,250, 20% propylene oxide, 80% ethylene oxide), and P-85 (MW 4500, 50% propylene oxide, 50% ethylene oxide).

The block copolymer dispersants can be prepared by building the block copolymers of ethylene oxide and propylene oxide onto a suitable nucleus which is usually a difunctional molecule such as an alkylene diamine e.g., ethylene diamine or a glycol such as ethylene glycol. Block copolymers based on ethylene diamine are commercially available, e.g., Tetronics (Wyandotte Chemical Corporation). The especially preferred Tetronic dispersants are water-soluble, e.g., Tetronic 707 and 908. Tetronic 707 comprises 30 weight percent polyoxypropylene of molecular weight, 2700, polymerized with 70 weight percent polyoxyethylene to give an overall molecular weight of 12,000. Tetronic 908 has 20 weight percent polyoxypropylene polymerized with 80 weight percent of polyoxyethylene to give an overall molecular weight of 27,000. In general, the preferred Tetronics have a molecular weight of at least about 10,000 and contain at least 50 weight percent of oxyethylene units, and most preferably, a major proportion by weight of oxyethylene units.

Mixtures of the dispersing agents, e.g., of Tetronic and Pluronic type, or mixtures of Pluronic or of Tetronic types can be employed.

The additional dispersants employed in this invention are alkali metal, e.g., Na, K, or Li, salts of polymerized carboxylic acids and condensed arylsulfonic acids which are well known dispersing agents and commercially available (refer to McCutcheon's *Detergents & Emulsifiers*, North American Edition, 1976). Sodium salts are usually preferred since they are readily available and more economical than potassium and lithium salts.

The polycarboxylic acid salt dispersants herein are prepared by way of well known and conventional procedures. Thus, for example, an unsaturated acid such as acrylic acid, a lower alkyl acrylic acid such as alphamethacrylic acid, ethylacrylic acid, propylacrylic acid, and the like, and other commonly available unsaturated acids such as maleic, fumaric, itaconic and crotonic acid, are polymerized or co-polymerized in a known manner to provide a polymeric acid which is then neutralized with an alkali metal hydroxide, preferably, sodium hydroxide, to provide the corresponding polymeric alkali metal carboxylate salt. If desired, up to 20% by weight of the polymerizable monomer can be made up of one or more other ethylenically unsaturated conomomers. A more common preparative method than the foregoing is to prepare a polymerized carboxylic acid ester by any one of several well known procedures, for example, by polymerizing methylacrylate, methylmethacrylate, ethylacrylate, ethylethacrylate, propylacrylate and the like, and partially or completely saponifying the resulting polymer, preferably with sodium hydroxide, to provide a sufficient number of carboxylate salt groups which will result in a polycarboxylic acid salt dispersant of anionic character. The sodium polyacrylates, polymethacrylates and homologues of these polycarboxylates are preferred for use herein.

The anionic polycarboxylic salts such as Daxad 30, an anionic sodium polymethacrylate salt (neutralization equivalent of about 14.3) available from W. R. Grace & Co. and a similar polycarboxylate salt, Darvan No. 7 available from R. T. Vanderbilt Co., are especially preferred for use herein since they have a reduced tendency to discolor the saponified ethylene-vinyl acetate copolymers.

Other commercially available anionic polycarboxylic acid salts which can be used herein include Dispex N 40 (Allied Colloids, Inc.) and Gradol 250 (Graden Chemical).

The condensed arylsulfonic acid salts prepared by reacting an aryl, e.g., naphthyl, phenyl, cresyl, tolyl, sulfonate salt with formaldehyde (or equivalent reactant) to form a condensation polymer in which the aryl groups are joined through methylene linkages. The polymers are generally referred to as neutral dispersing agents since their aqueous solutions have a pH at or near 7. Preferred condensed arylsulfonic acid salt dispersants comprise sodium salts of condensed naphthalene sulfonic acids and are readily available in commercial quantities, e.g., Tamol SN (Rohm and Haas Co.), Daxad 11 (W. R. Grace and Co.), Darvan No. 1 (R. T. Vanderbilt Co.), Dispersol ACA (ICI-United States Inc.) and Lomar D and Lomar PW (Diamond Shamrock) which are the sodium salts of condensed naphthylsulfonic acid.

The combined dispersing agents can be added to the saponification reaction mixture before or in the case of continuous processing during the reaction.

The saponifying agent employed is any of the strong inorganic bases known heretofore to be effective in causing the replacement of an acetoxy group in the polymer by a hydroxyl group. Examples of such strong inorganic bases are the alkali metal hydroxides such as sodium hydroxide, potassium hydroxide and lithium hydroxide.

In the saponification step, ethylene-vinyl acetate interpolymer to be dispersed and saponified is charged into a suitable reaction vessel together with water, the dispersing agents and the saponifying agent. The amount of water used is generally from about 0.33 to 9 parts by weight per part of the normally solid interpolymer, and preferably between about 0.8 and 4 parts of water per part of polymer. When preparing the more dilute dispersions, it is usually more economical to dilute a more concentrated dispersion. Dispersions containing more than about 75% of polymer are generally quite viscous and difficult to handle. The resin concentration is usually maintained between about 10% and 50%, with from about 15% to about 35% being preferred. To a limited extent, the dispersion becomes finer as the concentration of polymer increases, all other conditions being held constant.

The amount of strong inorganic base employed is at least stoichiometric with respect to the amount of vinyl acetate units desired to be saponified. It is preferred to use a stoichiometric excess of base and it is most preferable to use 1.2–2 times the stoichiometric amount. The degree of saponification obtained can be any desired amount from about 1–98%. A degree of saponification ranging from about 40–95% is preferred.

In the present process, the ratio of polymer to dispersing agent is not absolutely critical but certain ratios appear to give better results and are therefore preferred. In general, the ratio of polymer to the non-ionic surfactant, e.g., Pluronic, is preferably from about 8:1 to about 1:1 and most preferably from about 1:1 to about 1.5:1. The ratio of polymer to the additional dispersants, e.g., Daxad 30 or Tamol SN, is preferably from about 4:1 to about 1:1 with the preferred ratio being from about 1.5:1 to about 2.5:1. Thus, the ratio of non-ionic dispersant to the additional dispersant is from about 1:1 to about 2:1.

The dispersion operation for the saponification step is carried out at any temperature sufficiently above the melting point or softening point of the ethylene-vinyl acetate copolymer to permit mixing of the resin in the dispersant solution and below the degradation temperature thereof. Flow properties of the polymer differ with molecular weight and/or melt index. Thus, preferred temperatures will be determined experimentally for each polymer selected from simultaneous saponification and dispersion. The dispersion temperature will generally range from about 115° to about 300° C. with temperatures of about 130° to about 230° C. being preferred. Higher temperatures result in greater fluidity and usually generally smaller particles as well as a greater degree of saponification.

The pressure employed in the present process is normally the vapor pressure of the system at the operating temperature, i.e., autogenous pressure. Preferably, the pressure should be sufficient to maintain most of the water in the liquid phase. This can be accomplished by using a reactor which is $\frac{2}{3}$ to $\frac{3}{4}$ liquid full which will contain only a small percent of water vapor. The process can, if desired, be carried out at elevated pressure of air or inert gas in which case substantially all of the water will remain in the liquid phase. The pressure may vary from about 3 to 100 atmospheres, and even higher, with the preferred range being from about 5 to about 30 atmospheres.

The saponification step results in the simultaneous saponification and dispersion of the ethylene-vinyl acetate into fine particles generally having a particle size of less than 100 microns, the majority (usually greater than 70%) of which are less than 50 microns. The reaction mixture is cooled to any convenient temperature below the softening point of the resin, preferably below about 100° C., and the fine particles are separated and recovered in any convenient fashion such as by filtration, centrifuging or decanting.

The retention time in the reactor will be predicated on the amount of vinyl acetate initially present in the polymer and the degree of hydrolysis desired and thus can be determined experimentally for each polymer selected. Retention time at specific operating temperature can vary from several minutes to one hour or longer, although generally 10 minutes is sufficient to obtain the degree of hydrolysis desired. Thus, optimum conditions can be determined for any desired degree of hydrolysis of the vinyl acetate content with a minimum of routine experimentation.

The dispersing apparatus or device used in the foregoing procedure can be any device capable of delivering at least a moderate amount of shearing action under elevated temperatures and pressures to a liquid mixture. For example, conventional autoclaves equipped with conventional propeller stirrers are suitable. Propellers designed to impart greater shear to the mixture tend to improve the recovered yield of pulverant polymer but have little effect on the particle size and distribution thereof. The particle size and distribution are somewhat dependent on the stirring rate with higher stirring speeds resulting in finer and narrower dispersions until an optimum speed is reached above which there is little change. The overall recovery yield of the finely divided polymer is dependent upon the duration of stirring. For a given type and rate of stirring, a period of stirring exists within which a maximum recoverable yield of finely divided resin results. Either shorter or longer periods of shearing result in lower recoverable yields. The stirring periods can vary from as little as 1 second to as long as 2 hours with preferred stirring periods from about 1–30 minutes. It will be understood, however, that the stirring rates and periods will depend on the type of equipment utilized. Further, it will be recognized that while the rate and duration of agitation affect particle size and distribution and recoverable yields, these variables can be readily optimized for any given system through simple routine experimentation.

The unique, finely divided spherical particles of saponified ethylene-vinyl acetate copolymers produced according to this invention are of value in many applications. Foremost among these are those in the powder coating field, for example, as hard, transparent, adherent coatings on metal and glass surfaces. The finely divided state favors ease of application by electrostatic coating methods, where the spherical shape of the particles is believed to promote greater control of the coating process by virtue of more uniform charge distribution. In addition, the ultrafine particle size is a distinct advantage because it favors the deposition of coatings of minimal thickness, and consequently minimum coating costs. Other advantages of the saponified ethylene-vinyl acetate fine powders of this invention include the relative narrow particle size ranges which may be produced without classification. Classification is a particularly difficult procedure with powders having particle sizes as low as 10 microns. In general, the production of fine powders by the present invention is a simpler and less costly procedure than alternative powder forming operations such as grinding and spray drying.

In the accompanying examples, the apparatus employed is a modified, Series 4500, two liter Parr pressure reactor manufactured by the Parr Instrument Company, Moline, Illinois. The agitation is provided by three, 3 inch diameter, six-blade, flat turbines, located on 2$\frac{1}{4}$ inch centers with the lower turbine positioned about $\frac{1}{2}$ inch above the bottom of the vessel. The reactor also contains four vertical baffles, 9 inches long by $\frac{1}{4}$ inch wide by $\frac{1}{8}$ inch thick, positioned at 90° intervals about 1/16 inch off the reactor wall. A $\frac{1}{2}$ inch drain line and valve were installed in the bottom of the reactor to permit discharge of the reaction mass at operating pressure and temperature.

The following examples further illustrate the invention.

EXAMPLE 1

200 Parts of an ethylene-vinyl acetate copolymer having a density of 0.928, a melt index of 3, and a vinyl acetate content of 6.68%, 200 parts of Pluronic F-98, 100 parts of Tamol SN, 50 parts of sodium hydroxide and 890 parts of water are charged to the modified Parr reactor. The reaction mass is heated with gentle agitation until the temperature reaches 440° F. and the agitator speed is then increased to 2000 rpm and continued for 10 minutes while maintaining the temperature at 440° F. The reaction mass is then immediately discharged into a receiver containing 3000 ml. of cold water. The apparatus is so arranged that the discharge line in the bottom of the reactor extends below the surface of the water in the receiver.

The resultant slurry after filtering on a conventional laboratory Buchner funnel is washed thoroughly with water to remove residual surfactant and sodium hydroxide, and then dried at 160° F. to a moisture content of ½%. A Coulter Counter particle size analysis of the dried product reveals a geometric mean particle size by weight of 32 microns, with 82% of the particles having a diameter less than 50 microns. Microscopic examination of the product shows that substantially all of the particles are spherical. The vinyl acetate content of the product determined by saponification is found to be 4.17%.

EXAMPLE 2

Example 1 is repeated except that the resin employed has a density of 0.95, a melt index of 3, and an initial vinyl acetate content of 26.65%, and the dispersion temperature is 420° F. Again the product is recovered as fine spherical particles. The geometric mean particle size is 19 microns, and 99.6% of the particles are less than 50 microns. The residual vinyl acetate content is 4.72%.

EXAMPLE 3

Example 2 is repeated except that the sodium hydroxide charge is reduced to 25 grams, and the Pluronic F-98 charge to 150 grams. The product is recovered as spherical particles having a geometric mean particle size of 20 microns, with 98.4% of the particles having a diameter less than 50 microns. The residual vinyl acetate content is 13.27%.

EXAMPLE 4

Example 1 is repeated using a resin having a density of 0.941, a melt index of 20, and a vinyl acetate content of 35.33%. The Pluronic F-98 charge is 150 grams and the dispersion temperature is 430° F. The product is recovered as spherical particles having a geometric mean particle diameter of 18 microns, with 99.3% of the particles having a diameter of less than 50 microns. The residual vinyl acetate content is 3.32%.

EXAMPLE 5

Example 1 is repeated using a resin having a density of 0.98, a melt index of 1 and a vinyl acetate content of 51.14%. The Pluronic F-98 charge is 150 grams and the dispersion temperature is 370° F. The product is recovered as spherical particles having a geometric mean particle diameter of 17 microns, with 98.6% of the particles having a diameter less than 50 microns. The residual vinyl acetate content is 17.06%.

EXAMPLES 6-10

In these examples, Example 1 is repeated using a resin having a density of 0.95, a melt index of 3, and an initial vinyl acetate content of 26.65%. The surfactant charge in each case is 150 grams. In all of the examples, except Example No. 10, virtually all of the product is recovered as spherical particles. The product obtained with the Tetronic T-908 surfactant is not as uniformly dispersed as that obtained with the Pluronic surfactant. There appear throughout the product small fibers and threads and larger particles of unreacted material. These all must be removed before determining the particle size by the Coulter Counter. In Example No. 10 the product was screened through a U.S. Standard 140 Mesh screen. The fraction retained on the screen is 19% by weight of the total sample.

| Example No. | Surfactant | | | Product Analysis | | |
|---|---|---|---|---|---|---|
| | Type | Mol. Wt. | % Hydrophilic Units | Geo. Mean Dia. by Weight μ | Wt. % Less Than 50 Microns | % Residual Vinyl Acetate |
| 6 | Pluronic F-88 | 10,800 | 80 | 39 | 71 | 9.24 |
| 7 | Pluronic P-105 | 6,500 | 50 | 20 | 99.8 | 4.23 |
| 8 | Pluronic F-108 | 14,000 | 80 | 30 | 88 | 10.66 |
| 9 | Pluronic F-127 | 12,500 | 70 | 20 | 99 | 3.39 |
| 10 | Tetronic T-908 | 27,000 | 80 | 33[1] | 85[1] | 6.66 |

[1]After screening through U.S. Standard 140 Mesh screen to remove fibers, strings and large particles.

EXAMPLE 11

Example 1 is repeated using a resin having a density of 0.95, a melt index of 3, and an initial vinyl acetate content of 26.65%, but with no Pluronic surfactant. There is no dispersion of the resin which remains in the reactor, adhered to the sidewalls and the agitator as a continuous mass, and has to be scraped and melted from the reactor.

EXAMPLE 12

Example 11 is repeated but the Tamol SN charge is increased from 100 to 200 grams. The result is the same with no dispersion of the resin.

EXAMPLE 13

A series of 18 dispersions are prepared with a resin having a density of 0.95, a melt index of 3, and an initial vinyl acetate content of 26.65%. The conditions of Example 1 are employed except that the reactor temperature is 420° F. and the Pluronic F-98 charge is 150 grams. Further, in one-half, or nine, of the dispersions the Tamol SN charge is omitted. The product is isolated, washed and dried as described in Example 1, and samples are used for vinyl acetate determination. The nine runs of each of the two series are randomly subdivided into three sets of three runs each. The three runs of each set are then combined, blended with 1% by weight Cab-O-Sil M-7, and screened over a U.S. Standard 140 Mesh (105 micron) screen. The following results are obtained:

| Set | Tamol Charge gms | Percent by Weight +140 Mesh | Percent by Weight −140 Mesh | Vinyl Acetate Wt.% - Avg. |
|---|---|---|---|---|
| 13A | 0 | 37.5 | 62.5 | 11.23 |
| 13B | 0 | 70.8 | 29.2 | 11.12 |
| 13C | 0 | 60.6 | 39.4 | 11.13 |
| Avg. | | 56.3 | 43.7 | 11.16 |
| 13D | 100 | 1.1 | 98.9 | 7.36 |
| 13E | 100 | 0.4 | 99.6 | 7.49 |
| 13F | 100 | 0.1 | 99.9 | 7.50 |
| Avg. | | 0.5 | 99.5 | 7.45 |

EXAMPLE 14

200 Parts of an ethylene-vinyl acetate copolymer having a density of 0.948, a melt index of 2 and a vinyl acetate content of 27.9%, 200 parts of Pluronic F-98, 100 parts of Tamol SN, 50 parts of sodium hydroxide and 100 grams of NH$_4$OH and 915 gms of water are charged to the modified Parr reactor. The reaction mass is heated with gentle agitation until the temperature reaches 420° F; the agitator speed is then increased to 2000 rpm and continued for 10 minutes while maintaining the temperature at 420° F. The reaction mass is then discharged into the receiver containing 3000 ml of cold water.

The slurry is filtered and the filter cake washed thoroughly to remove residual surfactant and alkali, and then dried. The product is screened through a U.S. Standard 140 mesh (105 micron) screen; 98.8% of the product passed through the screen. A Coulter Counter particle size analysis of the minus 140 mesh fraction revealed a geometric mean particle size by weight of 15 microns with 99% of the particles having a diameter less than 50 microns. Substantially, all of the particles are spherical. Residual vinyl acetate content of the product is 4.43%.

EXAMPLES 15 through 23

In these examples, Example 14 is repeated except that the surfactants shown in the following table are substituted for the Tamol SN. (The Pluronic F-98 charge is 200 grams in all cases). Only in Example 22 is a fine particle dispersion obtained but even in this case nearly 20% of the product is retained on a 140 mesh screen, and the residual vinyl acetate content of the product is 13.4%. In none of the other examples is a uniform dispersion of discrete fine particles obtained. For example, in Example 16, 99% of the product is retained on a 140 mesh screen and 87% on a 50 mesh screen. Further the maximum degree of hydrolysis achieved in any of the examples is to a residual vinyl acetate content of 12.2% in Example 15.

| Example No. | Surfactant Type | Gms | Temp. ° F. | Percent by Weight +140 Mesh | Percent by Weight −140 Mesh | Vinyl Acetate Wt.% |
|---|---|---|---|---|---|---|
| 15 | Dow Corning 470A Fluid | 100 | 420 | 95 | 5 | 12.2 |
| 16 | Dow Corning 473 Fluid | 100 | 420 | 95 | 5 | 21.5 |
| 17 | Dow Corning 474A Fluid | 100 | 430 | 95 | 5 | 15.3 |
| 18 | Rohm and Haas Priminox R-15 | 50 | 410 | 95 | 5 | 17.9 |
| 19 | Rohm and Haas Priminox T-25 | 100 | 420 | 95 | 5 | 13.3 |
| 20 | Rohm and Haas Triton QS-15 | 100 | 410 | 95 | 5 | 13.7 |
| 21 | Rohm and Haas Triton QS-44 | 100 | 420 | 95 | 5 | 13.2 |
| 22 | Rohm and Haas Triton QS-44 | 50 | 410 | 19.5 | 80.5 | 13.4 |
| 23 | Rohm and Haas Triton X-405 | 100 | 410 | 95 | 5 | 17.9 |

Dow Corning 470A, 473, 474A are nonionic silicone glycol copolymers, with the following unit structure formulas:
470A - polyoxyethylene polymethylsiloxane
473 - polyethylene polyoxypropylene polymethylsiloxane
474A - polyoxyethylene polyoxypropylene polymethylsiloxane
The Rohm and Haas surfactants are described as follows:
Priminox R-15 a polyethoxy amine RNH(CH$_2$CH$_2$O)$_{15}$H
Priminox T-25 a polyethoxy amine RNH(CH$_2$CH$_2$O)$_{25}$H
Triton QS-15 sodium salt of amphoteric surfactant
Triton QS-44 phosphate surfactant in free acid form
Triton X-405 alkyl aryl polyether alcohol

EXAMPLES 24 through 38

In these examples, 200 parts of an ethylene-vinyl acetate copolymer having a density of 0.95, a melt index of 3.0, and a vinyl acetate content of 25.51%, 150 parts of Pluronic F-98, 50 parts of sodium hydroxide and 890 parts of water plus the second surfactant as shown in the following table are charged to the modified Parr reactor. The reaction mass is heated with gentle agitation until the temperature reaches 440° F and the agitator speed is increased to 2000 rpm and continued for 10 minutes while maintaining the temperature at 440° F. The reaction mass is then discharged into a receiver containing 3000 parts of cold water. The product is recovered, washed, dried, and analyzed in the conventional way.

Results are shown in the table.

| Example No. | Surfactant Type | Gms | Temp. ° F | Percent by Weight + 140 Mesh | Percent by Weight − 140 Mesh | Geo.Mean Diameter −μ[1] | Vinyl Acetate % |
|---|---|---|---|---|---|---|---|
| 24 | Daxad 11 | 100 | 423 | 3.8 | 96.2 | 29 | 2.65 |
| 25 | Daxad 11 | 50 | 415 | 3.0 | 97.0 | 44 | 9.27 |
| 26 | Darvan No. 1 | 100 | 418 | 8.0 | 92.0 | 23 | 6.62 |
| 27 | Darvan No. 1 | 50 | 450 | 9.3 | 90.7 | 25 | 4.90 |
| 28 | Dispersol ACA | 100 | 430 | 4.3 | 95.7 | 23 | 6.00 |
| 29 | Dispersol ACA | 50 | 440 | 0.8 | 99.2 | 28 | 7.24 |
| 30 | Lomar D | 100 | 430 | 1.6 | 98.4 | 24 | 7.63 |
| 31 | Lomar D | 50 | 425 | 0.8 | 99.2 | 22 | 10.47 |
| 32 | Lomar PW | 100 | 428 | 4.0 | 96.0 | 24 | 10.78 |
| 33 | Lomar PW | 50 | 430 | 3.2 | 96.8 | 26 | 10.32 |
| 34 | Daxad 30 | 100 | 430 | 2.8 | 97.2 | 26 | 8.99 |
| 35 | Daxad 30 | 50 | 440 | 4.4 | 95.6 | 23 | 8.86 |

-continued

| Example No. | Surfactant Type | Gms | Temp. °F | Percent by Weight +140 Mesh | Percent by Weight −140 Mesh | Geo.Mean Diameter −μ(1) | Vinyl Acetate % |
|---|---|---|---|---|---|---|---|
| 36 | Daxad 30 | 25 | 440 | 0.4 | 99.6 | 28 | 8.38 |
| 37 | Darvan 7 | 100 | 442 | 5.4 | 94.6 | 27 | 4.96 |
| 38 | Darvan 7 | 50 | 436 | 8.0 | 92.0 | 24 | 3.19 |

(1) Geometric mean particle diameter by volume of the -140 mesh fraction by Coulter Counter analysis.

EXAMPLES 39 through 44

These examples demonstrate the effect of variations in surfactant concentrations. 200 parts of an ethylene-vinyl acetate copolymer having a density of 0.95, a melt index of 1.8 and a vinyl acetate content of 28.93%, 50 parts of sodium hydroxide, 890 parts of water plus the surfactants as shown in the accompanying table are charged to the modified Parr reactor. The reaction mass is heated with gentle agitation until the temperature reaches 420°-430° F. The agitator speed is increased to 2000 rpm and continued for 10 minutes while maintaining the temperature in this range. The reaction mass is then discharged into a receiver containing 3000 parts of cold water. The product is recovered, washed, dried and analyzed in the conventional way.

Results are shown in the table.

| Example No. | Surfactants Pluronic F-98 gms | Surfactants Tamol SN gms | Temp. °F | Percent by Weight +140 Mesh | Percent by Weight −140 Mesh | Geo. Mean Diameter μ(1) | Vinyl Acetate % |
|---|---|---|---|---|---|---|---|
| 39 | 100 | 50 | 430 | 1.3 | 98.7 | 42 | 9.62 |
| 40 | 50 | 50 | 420 | 61.6 | 38.4 | 51 | 16.00 |
| 41 | 25 | 50 | 432 | 70.1 | 29.9 | 34 | 18.86 |
| 42 | 150 | 40 | 440 | 2.2 | 97.8 | 34 | 5.84 |
| 43 | 150 | 20 | 430 | 1.39 | 98.6 | 27 | 5.39 |
| 44 | 150 | 10 | 425 | 0.86 | 99.1 | 38 | 9.92 |

(1) Geometric mean particle diameter by volume of the −140 mesh fraction by Coulter Counter analysis.

EXAMPLE 45

This example illustrates a continuous process for saponifying ethylene-vinyl acetate according to the present invention.

An ethylene-vinyl acetate resin having a density of 0.95 and containing 26.7% vinyl acetate is heated to approximately 460° F. and fed continuously into the bottom of a 0.4 cubic foot reactor at a rate of 10 pounds per hour. A surfactant solution containing 16.0% by weight Pluronic F-98 and 3.0% by weight Daxad 30 is heated to 450° F. and fed continuously into the reactor at a rate of 21 pounds per hour. A sodium hydroxide solution containing 15.0% by weight NaOH is heated to 180° F. and fed continuously to the reactor at a rate of 8.2 pounds per hour. Agitation in the reactor is provided by three, four-inch diameter, six flat blade turbines, and operated at 1200 rpm. Temperature in the reactor is maintained at 440°-450° F. by circulating a 470°-480° F. Dowtherm stream through the reactor jacket. Operating level in the reactor is maintained by a level controller which operates a let-down or discharge valve. Average retention time in the reactor is 28 minutes. The polymer slurry flows from the reactor through a water jacketed cooling exchanger where the temperature is reduced to about 150° F. The slurry is filtered, washed thoroughly to remove residual caustic, sodium acetate, and surfactant, and then dried. The product is recovered as a fine powder, with a geometric mean diameter of 42 microns. Samples were taken from the reactor discharge valve at one-half hour intervals, washed, dried and analyzed for residual vinyl acetate. The following results were obtained:

| Time-Hours After Start | Vinyl Acetate % |
|---|---|
| 0.5 | 15.98 |
| 1.0 | 16.07 |
| 1.5 | 16.95 |
| 2.0 | 16.64 |
| 2.5 | 16.42 |
| 3.0 | 17.69 |
| 3.5 | 16.21 |
| 4.0 | 16.45 |

The degree of hydrolysis can be controlled by varying the retention time and the caustic concentration. For example, extending the retention time to 40 minutes reduces the vinyl acetate content to about 12%. Full hydrolysis, i.e., less than about 3% residual vinyl acetate, can be achieved in about 60 minutes. The continuous process illustrated herein can be carried out at the flow rates and conditions described above employing the equipment and procedure disclosed in U.S. Pat. No. 3,432,432 which is incorporated by reference herein. The two surfactants are fed together, a separate pump and line are required for the caustic feed.

What is claimed is:

1. A process for preparing in finely divided form saponified ethylene-vinyl acetate polymer comprising the steps of heating with agitation an aqueous mixture comprised of molten ethylene-vinyl acetate polymer, a strong inorganic base, a block copolymer of ethylene oxide and propylene oxide containing at least about 50% by weight ethylene oxide and at least one other anionic dispersant selected from the group consisting of a salt of a polycarboxylic acid and a condensed arylsulfonate salt at a temperature below the decomposition temperature of the polymer and cooling the resulting dispersion to obtain the saponified product in finely divided state with the majority by weight of the particles being less than 50 microns in diameter.

2. Process according to claim 1 including the further step of recovering the saponified product in finely divided state.

3. Process according to claim 1 wherein said block copolymer is of a molecular weight above about 3500.

4. Process according to claim 1 wherein said salt of a polycarboxylic acid is an alkali metal polycarboxylic acid salt.

5. Process according to claim 1 wherein said condensed arylsulfonate is condensed naphthalene sulfonate in the form of the sodium salt.

6. Process according to claim 1 wherein the temperature employed is from about 130° to about 230° C.

7. Process according to claim 1 wherein the process is conducted at a pressure of from about 5 to about 30 atmospheres.

8. Process according to claim 7 wherein said other anionic dispersant is present in the aqueous solution during the saponification.

9. Process according to claim 1 wherein the ethylene-vinyl acetate polymer has a melt index of less than about 40.

10. Process according to claim 1 wherein the ethylene-vinyl acetate polymer has a melt index of less than about 25.

11. Process according to claim 1 wherein the ethylene-vinyl acetate polymer has a melt index of less than about 10.

12. A process for preparing in finely divided form ethylene-vinyl acetate polymer having a melt index of less than about 40 comprising the steps of heating with agitation an aqueous mixture comprised of molten ethylene-vinyl acetate polymer, a strong organic base, a block copolymer of ethylene oxide and propylene oxide containing at least about 50 percent by weight ethylene oxide and having a molecular weight above about 3500, and at least one other anionic dispersant selected from the group consisting of a sodium salt of a polycarboxylic acid and a condensed naphthalene sulfonate in the form of the sodium salt at a temperature from about 130° to about 230° C. and a pressure of from about 5 to about 30 atmospheres and cooling the resulting dispersion to obtain the saponified product in finely divided state with the majority by weight of the particles being less than 50 microns in diameter.

* * * * *